United States Patent Office 2,923,578
Patented Feb. 2, 1960

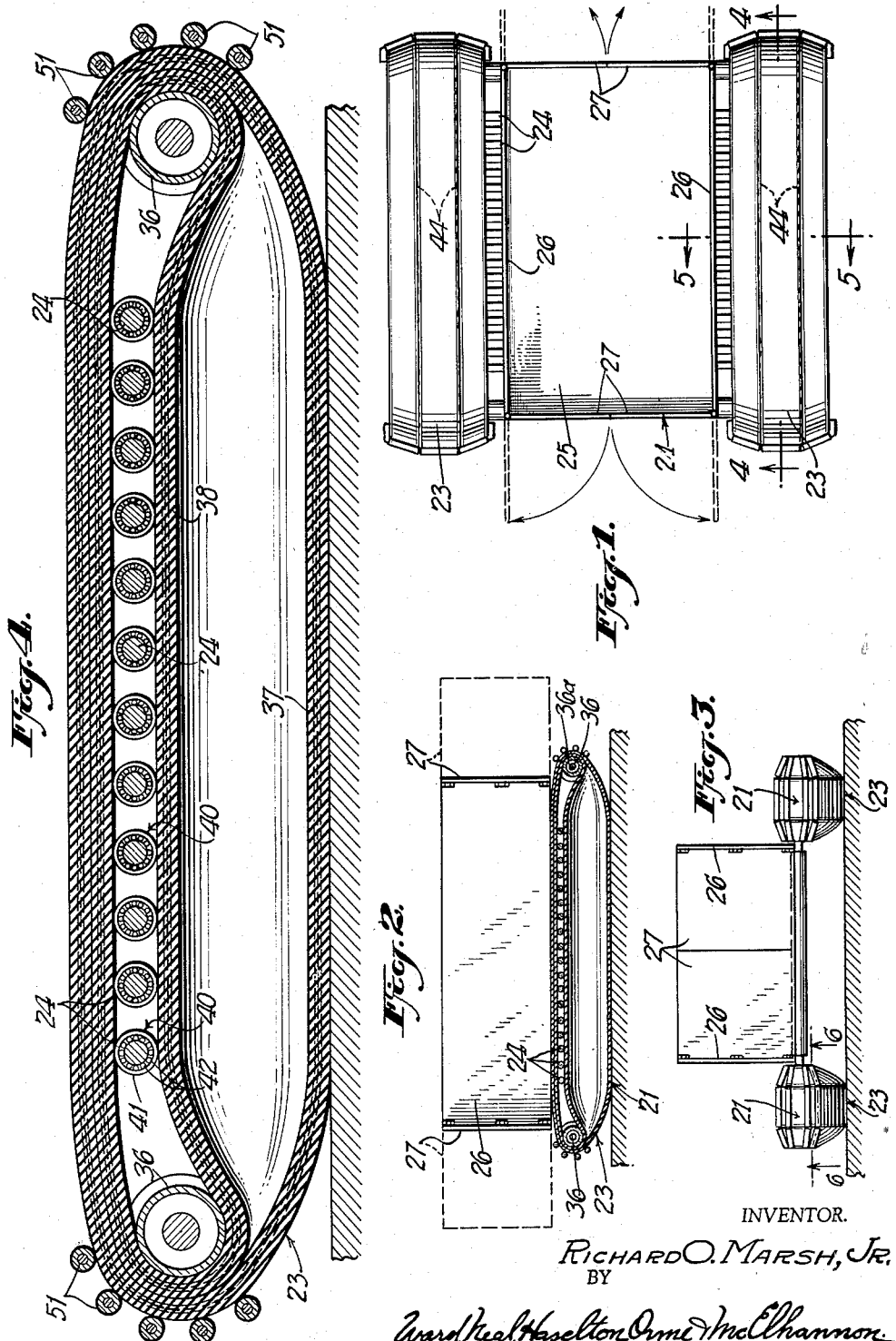

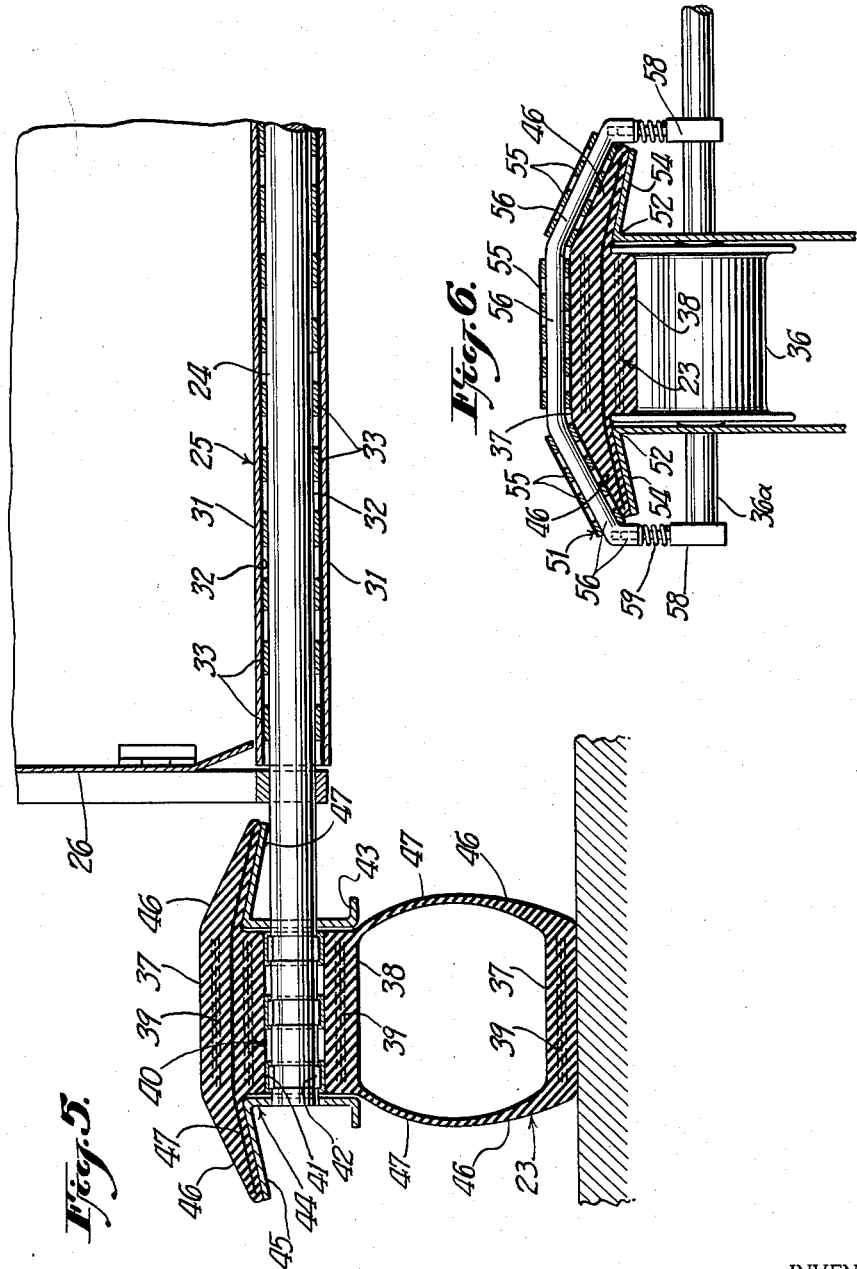

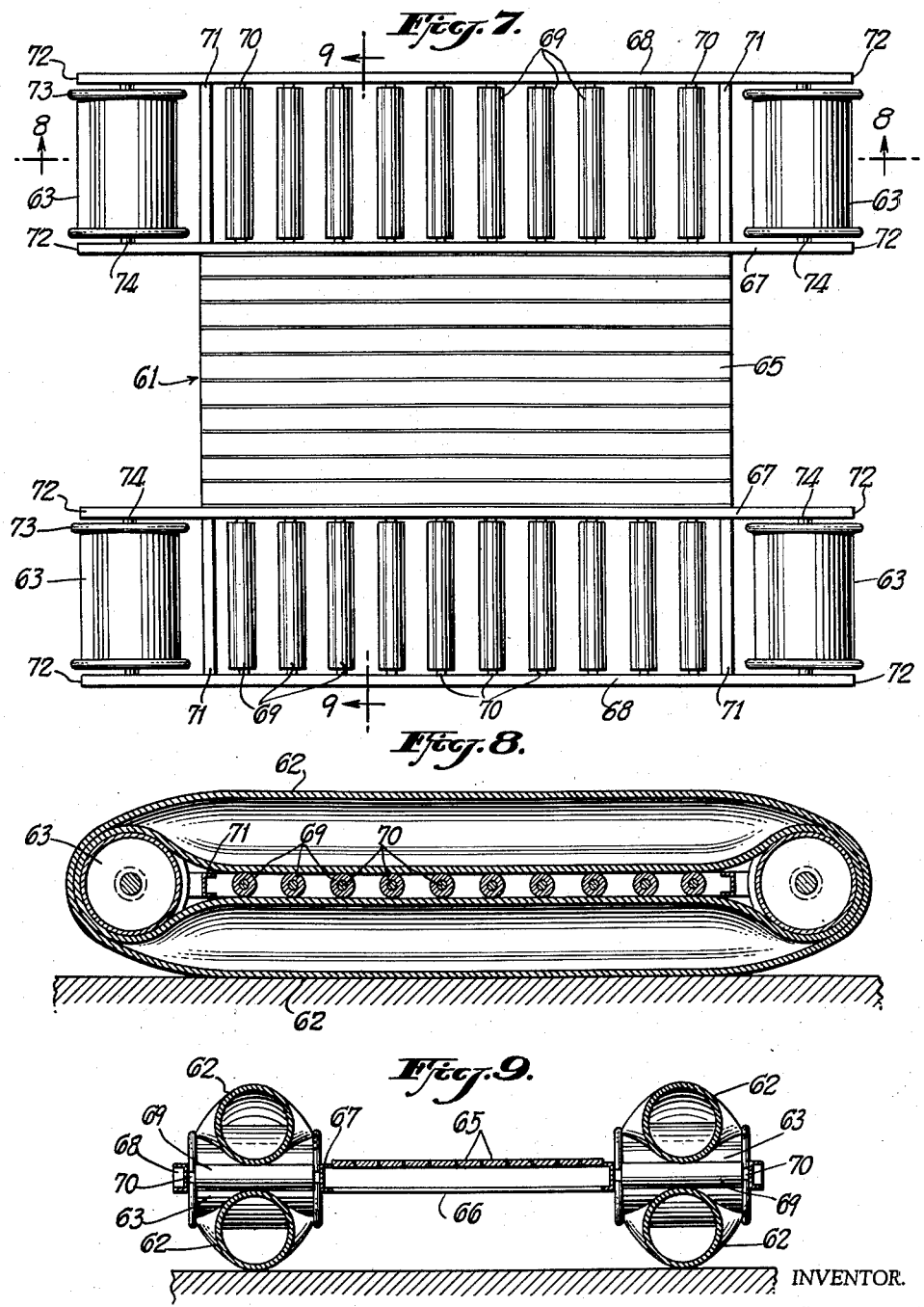

2,923,578
PNEUMATIC TRACK DEVICE
Richard O. Marsh, Jr., Sewickley, Pa.
Application November 28, 1958, Serial No. 776,967
5 Claims. (Cl. 305—2)

This invention relates to improved pneumatic track arrangements and more especially such arrangements for use with or as a part of vehicles such as trucks, trailers, swamp buggies, etc.

In the preferred embodiments, the present invention contemplates a track device comprising an endless tubular member formed of flexible material and inflatable with compressed gas, terminal rollers about which said tubular member passes, means for deflating said tubular member as it passes over said terminal rollers, and intermediate rollers for transmitting the weight of said vehicle to said tubular member.

Various further and more specific objects, features and advantages of the invention will appear from the description taken in connection with the accompanying drawings which form a part of this specification and illustrate, by way of example, the presently preferred embodiments of the invention. The invention consists in such novel features and combinations as may be shown and described in connection with the apparatus herein disclosed.

In the drawings:

Fig. 1 is a plan view of a vehicle embodying the invention;

Fig. 2 is a vertical longitudinal sectional view of the vehicle shown in Fig. 1;

Fig. 3 is an end elevation view of the vehicles shown in Fig. 1;

Fig. 4 is a sectional view taken along line 4—4 of Fig. 1;

Fig. 5 is a partial sectional view taken along line 5—5 of Fig. 1;

Fig. 6 is a partial sectional view taken as indicated by line 6—6 of Fig. 3;

Fig. 7 is a plan view of another vehicle constructed in accordance with the invention with certain parts removed for clarity;

Fig. 8 is a sectional view taken as indicated by line 8—8 of Fig. 7; and

Fig. 9 is a sectional view taken as indicated by line 9—9 of Fig. 7.

Referring to the drawings in further detail, Figs. 1 to 3, inclusive, show a vehicle 21 having the pneumatic tracks 23. The load carrying portion of the vehicle 21 includes a series of transverse members 24 and a conveyor bed floor 25. Side walls 26 and hinged end gates 27 may be secured to the transverse members 24 or to other suitable frame members in any suitable manner. As best shown in Fig. 5, the conveyor bed 25 comprises a conveyor belt 31 which moves on conveyor belt roller sleeves 32 surrounding cylindrical portions of the transverse members 24 and moving on roller bearings 33.

It should be understood that any suitable type of frame and superstructure may be employed in the vehicle 21. The conveyor bed floor with sides and hinged end gates described above is especially adapted for use on vehicles designed to carry heavy earth moving equipment or the like. It is, however, entirely within the scope of the invention to employ any suitable type of vehicle frame, superstructure, etc., and, while vehicles such as 21 embodying the invention are preferably self-powered, the invention may be embodied in either self-powered or unpowered vehicles.

As best seen in Figs. 4 and 5, the pneumatic tracks 23 each comprise an endless inflatable tube passing around terminal rollers or sprocket wheels 36 which may be mounted on the frame of the vehicle in any suitable manner such as by means of conventional axles 36a (Fig. 6) journaled in the frame of the vehicle in any suitable manner. The terminal rollers 36 serve to transmit driving or braking forces to the track through frictional engagement therewith. As best shown in Fig. 5, each of the tracks 23, at the portion which engages the ground, is of generally circular cross-section and may have reinforced portions 37 and 38 at the portions of the track which come in contact with the ground and vehicle respectively. The tracks 23 may be constructed of any suitable material such as fabric which may be impregnated with rubber or the like and the reinforced areas 37 and 38 may comprise rubber or the like suitably reinforced with cords in a manner similar to conventional automobile or truck tires. If desired, suitable stiffening members, such as rods 39, may be used in the reinforced portions.

As shown in Fig. 4, the lower portion of each track 23 is inflated with air or other gas under pressure and the weight of the vehicle is transferred to the inflated lower portion of the track by suitably mounted intermediate rollers 40 shown here in the form of roller sleeves 41 which are mounted on cylindrical end portions of the transverse members 24 and move on roller bearings 42. The roller sleeves 41 and roller bearings 42 may be similar to the roller sleeves 32 and roller bearings 33 described above. It should be understood that, if desired, the roller sleeves 41 may surround frame members other than the transverse frame members 24 and the intermediate rollers 40 may, in fact, take any suitable form and be supported in any suitable manner so long as the weight of the vehicle is transferred by them to the inflated lower portions of the pneumatic tracks 23. The pressure to which the lower portions of the tracks 23 are inflated will, of course, vary with the design of the vehicle and the load to be carried.

By distributing the weight of the vehicle over substantially the length of the tracks by means of the intermediate rollers 40 as described above, the pressure per unit area which the vehicle exerts on the ground is substantially reduced as compared with that which would be exerted by conventional wheels and the vehicle is enabled to move over soft or marshy ground with relative ease. It is contemplated that in some circumstances, especially in the design of a relatively lightweight vehicle, it might be desirable to design the tracks 23 so that a sufficient volume of air may be contained within the inflated portion thereof to enable the vehicle to float on water. The vehicle would thus be enabled to travel not only over soft ground but also over water.

In the embodiment shown, the lower portion of each of the tracks 23 is deflated as it passes around one of the terminal rollers 36 and remains deflated as it crosses over the top of the intermediate rollers 40 and around the other terminal roller (Fig. 4). In this way only the lower portion of the track is inflated while the upper portion remains deflated. This avoids bulky inflated portions of the track above the intermediate rollers but, if desired, the tracks may be somewhat inflated above as well as below the intermediate rollers.

The frame of the vehicle 21 preferably includes suitable guides or channels to guide the pneumatic tracks 23 as they pass around the terminal rollers 36 and the intermediate rollers 40. As best shown in Fig. 5, such guides may take the form of lower guide rails 43 and upper guide rails 44. These guide rails are shown as comprising suitably shaped extending rails fastened to the outer ends of the transverse members 24 and extending substantially the length of the vehicle between the terminal rollers (Fig. 1). From Fig. 5 it can be seen that the lower guide rails 43 are shaped to guide the reinforced portions 38 of the pneumatic tracks 23. The upper guide rails 44 are likewise shaped to guide the reinforced portions 38 of the tracks and have extending portions 45 adapted to provide support for extending portions 46 of the reinforced areas 37 of the tracks. The high degree of flexibility of the portions 47 of the walls of the tracks intermediate the reinforced portions 37 and 38 allow the collapse of the tracks on the upper guide rails 44 as shown in Fig. 5. The guide rails 43 and 44 may so extend as to provide suitable support for the axles of the terminal rollers 36.

As shown in Figs. 4 and 6, deflating rollers 51 are preferably used to aid in deflating the tracks 23 as they pass around the terminal rollers 36. By the use of such deflating rollers, the compressed air may be kept substantially entirely within the lower portion of the track as shown, and good frictional engagement is assured between the tracks and the terminal rollers for driving or braking the vehicles. As best shown in Fig. 6, the deflating rollers 51 may operate in conjunction with guide rails such as 52 carried on the terminal rollers 36. The guide rails 52 may be similar to the upper guide rails 44 described above and preferably have extending portions 54 adapted to guide and support the extending portions 46 of the reinforced portions 37 of the tracks. Each guide roller 51 may be of any suitable type and may, for instance, comprise suitably positioned rollers such as roller sleeves 55 surrounding suitably shaped frame members 56 and moving about roller bearings, if desired. The frame members 56 may be secured to the frame of the vehicle in any suitable manner such as by being attached to the frame near the point where the axles 36a are journaled as indicated at 58. As shown in Fig. 6, the frame members 56 are suitably shaped so that the roller sleeves 55 press the track 23 firmly against the guide rail 52. Springs, such as 59, may be used with the frame members 56 to help insure complete deflation of the track 23. The frame members 56 may be formed as a single piece or may comprise several pieces and these members as well as the guide rails 52 and the guide rails 43 and 44 described above may vary in shape depending upon the exact cross-sectional shape of the tracks 23 and the cross-sectional shape of the reinforced areas 37 and 38 of the tracks.

Figs. 7 to 9, inclusive, show a vehicle embodying the invention and having pneumatic tracks 62 of circular cross-section passing around cylindrical terminal rollers 63. The terminal rollers 63 are similar to the terminal rollers 36 described above in connection with the vehicle 21 and in a like manner may be used to drive or brake the vehicle by frictional engagement with the pneumatic tracks passing around them. In the form here shown, the load carrying portion of the vehicle comprises a platform formed by planks 65 laid across transverse frame members 66. The ends of the transverse members 66 are connected to inner longitudinal frame members 67. Intermediate rollers 69 are mounted between the inner longitudinal frame members 67 and parallel outer longitudinal frame members 68 by any suitable means such as axles 70 and suitable bearings. The outer longitudinal frame members 68 may be rigidly secured in position with respect to the inner frame members 67 by spacer members 71. In the embodiment shown, the terminal rollers 63 are mounted between extending portions 72 of the frame members 67 and 68 on axles 74 journaled in suitable bearings. The frame and superstructure, as well as the terminal rollers and intermediate rollers, may, of course, be of any suitable design and the vehicle, while preferably self-powered, may, if desired, be unpowered.

As best shown in Fig. 7, the terminal rollers 63 preferably have extending flanges 73 on their ends to serve as guides for the pneumatic tracks 62 while the tracks are passing around these rollers. If desired, suitable guide rails for guiding the pneumatic tracks along the upper and lower portions of the frame of the vehicle may be used. Such guide rails may be generally similar to the guide rails 43 and 44 described above in connection with vehicle 21.

The intermediate rollers 69 serve to transfer the weight of the vehicle to the lower portion of the pneumatic tracks 62 in a manner similar to that described above in connection with intermediate rollers 40 of the vehicle 21. Like the tracks 23, the tracks 62 are inflated to a suitable pressure where they pass beneath the intermediate rollers 69 between the terminal rollers 63. Since, in the specific embodiment shown in Figs. 7-9, the vehicle 61 is especially adapted for carrying relatively lighter loads than the vehicle 21, the tracks 62 need not necessarily include the reinforcing sections 37 and 38 described above in connection with the tracks 23. It should be understood, however, that the tracks 62 may be reinforced as with additional fabric at the portions subjected to the greatest wear such as the portions in contact with the ground. As shown in Figs. 7 to 9, inclusive, the tracks 62 may be inflated at their upper portions where they pass above the intermediate rollers 69 as well as at their lower portions where they serve to transfer the weight of the vehicle from the intermediate rollers 69 to the ground and may be deflated only when passing around the terminal rollers 63. However, the tracks 62 may, if desired, be inflated only where they pass between the terminal rollers 63 underneath the intermediate rollers 69 and may be allowed to remain deflated as they pass over the top of the intermediate rollers 69 in a manner similar to that described above in connection with vehicle 21. Also, in many instances it may be desirable to employ deflating rollers similar to the deflating rollers 51 described above in order to insure complete deflation of the tracks 62 as they pass around the terminal rollers 63. Such deflating rollers should be suitably shaped to conform to the contour of the terminal rollers 63 and in most instances will take the form of cylindrical rollers which serve to press the flexible material of the tracks 62 firmly against the cylindrical surface of the terminal rollers 63 as the tracks pass around the terminal rollers. Such deflating rollers may be mounted in any suitable manner such as on the extending portions 72 of the longitudinal frame members 67 and 68 described above.

While the invention has been described in detail with respect to certain preferred embodiments, it will be understood by those skilled in the art that various changes and modifications may be made without departing from the spirit and scope of the invention and it is intended to cover all such changes and modifications in the appended claims.

I claim:

1. A pneumatic track arrangement for a vehicle comprising an endless tubular member formed of flexible material and inflatable with compressed gas, terminal rollers about which said tubular member passes, means for deflating said tubular member as it passes over said terminal rollers, and intermediate rollers for transmitting the weight of said vehicle to said tubular member.

2. A pneumatic track arrangement for a vehicle comprising an endless tubular track formed of a flexible material and inflatable with compressed gas, terminal rollers about which said tubular track passes, deflating rollers mounted in position for deflating said tubular track as it passes over said terminal rollers, and intermediate rollers for transmitting the weight of said vehicle to said tubular track.

3. A pneumatic track device for a vehicle comprising an endless tubular member formed of flexible material and inflatable with compressed gas to a generally rounded cross-section, terminal rollers about which said tubular member passes and which are adapted to transmit driving and braking forces to said tubular member by frictional engagement therewith, deflating rollers associated with said terminal rollers for deflating said tubular member as it passes over said terminal rollers, and intermediate rollers spaced along said track intermediate said terminal rollers for transmitting substantially the entire weight of said vehicle to a lower inflated portion of said tubular member.

4. In a vehicle, the combination comprising: a frame including load bearing portions, an endless tubular track of circular cross-section formed of flexible material, terminal rollers about which said tubular track passes and which are adapted to transmit driving and braking forces to said track by frictional engagement therewith, said tubular track being inflated with compressed gas throughout a lower portion thereof extending between said terminal rollers, intermediate rollers mounted on said frame for transmitting substantially the entire weight of the vehicle to said inflated lower portion of the track, and deflating rollers mounted on said frame for deflating said track as it passes over said terminal rollers.

5. In a vehicle, the combination comprising: a frame including load bearing portions, an endless tubular track inflatable with compressed gas, of generally rounded cross-section when inflated, terminal rollers about which said tubular track passes and which are adapted to transmit driving forces to said track by frictional engagement therewith, intermediate rollers mounted on said frame for transmitting the entire weight of the vehicle to said inflated lower portion of the track, and means for deflating said tracks as it passes over said terminal rollers.

References Cited in the file of this patent

UNITED STATES PATENTS

| | | |
|---|---|---|
| 2,652,289 | Bekker | Sept. 15, 1953 |
| 2,714,011 | Albee | July 26, 1955 |
| 2,734,476 | Marsh | Feb. 14, 1956 |
| 2,867,480 | Cushman | Jan. 6, 1959 |